United States Patent
Ohsaka (10) Patent No.: US 12,551,886 B2
(45) Date of Patent: Feb. 17, 2026

(54) TARGET PARTICLE SEPARATION METHOD AND SYSTEM

(71) Applicant: TOKYO OHKA KOGYO CO., LTD., Kanagawa (JP)

(72) Inventor: Takashi Ohsaka, Kanagawa (JP)

(73) Assignee: TOKYO OHKA KOGYO CO., LTD., Kanagawa (JP)

( * ) Notice: Subject to any disclaimer, the term of this patent is extended or adjusted under 35 U.S.C. 154(b) by 602 days.

(21) Appl. No.: 17/998,963

(22) PCT Filed: May 14, 2021

(86) PCT No.: PCT/JP2021/018435
§ 371 (c)(1),
(2) Date: Nov. 16, 2022

(87) PCT Pub. No.: WO2021/241283
PCT Pub. Date: Dec. 2, 2021

(65) Prior Publication Data
US 2023/0173487 A1 Jun. 8, 2023

(30) Foreign Application Priority Data

May 25, 2020 (JP) .................................. 2020-090677

(51) Int. Cl.
*B01L 3/00* (2006.01)
*B01L 1/00* (2006.01)

(52) U.S. Cl.
CPC ... *B01L 3/502715* (2013.01); *B01L 3/502761* (2013.01); *B01L 2200/0652* (2013.01);
(Continued)

(58) Field of Classification Search
CPC .............................................. B01L 2200/0668
See application file for complete search history.

(56) References Cited

U.S. PATENT DOCUMENTS 10,416,070 B1 * 9/2019 Handique ................ G01N 1/40
2012/0085648 A1 * 4/2012 Kartalov ............. A61M 1/3496
210/806
(Continued)

FOREIGN PATENT DOCUMENTS

JP 2020027068 A * 2/2020 ............. C12N 1/02
WO WO-2018052847 A1 * 3/2018 ............. B01D 39/14
(Continued)

OTHER PUBLICATIONS

Axel Meye, et al., "Isolation and enrichment of urologic tumor cells in blood samples by a semi-automated CD45 depletion auto MACS protocol," International Journal of Oncology, 21; pp. 521-530; 2002, 521.
Zhian Liu, et al., "Negative enrichment by immunomagnetic nanobeads for unbiased characterization of circulating tumor cells from peripheral blood of cancer patients," Journal of Translational Medicine, pp. 1-8, 9:70; 2011.
(Continued)

*Primary Examiner* — Nathan A Bowers
(74) *Attorney, Agent, or Firm* — Rankin, Hill & Clark LLP (57) ABSTRACT

Provided are an introduction step of using a particle capturing device (1) for introducing a fluid including target particles (CT) and non-target particles (CA)-(CC) from an inlet channel (18) into a chamber (20), an enrichment step of enriching the target particles (CT) and at least a part of the non-target particles (CA) in a filter (12) by discharging at least a part of the fluid through the first outlet channel (8), a separation step of separating the filtered out non-target particles (CA) from the target particles (CT) by a suction unit (30), and a storage step of storing the target particles (CT) in wells.

10 Claims, 6 Drawing Sheets

(52) U.S. Cl.
CPC ............... *B01L 2300/0681* (2013.01); *B01L 2300/0816* (2013.01); *B01L 2300/0864* (2013.01); *B01L 2400/043* (2013.01)

(56) References Cited

U.S. PATENT DOCUMENTS

| | | |
|---|---|---|
| 2016/0348050 A1 | 12/2016 | Sivan et al. |
| 2018/0282677 A1* | 10/2018 | Ohsaka ............... C12M 23/12 |
| 2018/0297024 A1* | 10/2018 | Tran ................ B01L 3/50273 |
| 2019/0160433 A1* | 5/2019 | Chen .................... B01D 69/02 |
| 2020/0147611 A1 | 5/2020 | Choi et al. |
| 2021/0180116 A1* | 6/2021 | Hoffmann ............ C12Q 1/6806 |
| 2021/0293667 A1* | 9/2021 | Yotoriyama ............. G01N 1/14 |
| 2021/0362154 A1 | 11/2021 | Kojima et al. |

FOREIGN PATENT DOCUMENTS

| | | |
|---|---|---|
| WO | 2019049944 A1 | 3/2019 |
| WO | 2019-181098 A1 | 9/2019 |
| WO | 2020-009099 A1 | 1/2020 |

OTHER PUBLICATIONS

Sultan Khetani, "Filter-based isolation, enrichment, and characterization of circulating tumor cells," Biotechnology Bioengineering, WILEY, Oct. 2018, 115(10): pp. 2504-2529.
Soo Hyeon Kim, et al., "Cancer marker-free enrichment and direct mutation detection in rare cancer cells by combining multi-property isolation and microfluidic concentration," Lab on a Chip; The Royal Society of Chemistry, 2019, 19, pp. 757-766.
International Search Report dated Jul. 6, 2021 issued in PCT/JP2021/018435.

\* cited by examiner

TARGET PARTICLE SEPARATION METHOD AND SYSTEM

TECHNICAL FIELD

The present invention relates to a separation method and system for carrying out separating, capturing, detecting, isolating, and the like with regard to target particles such as cells.

Priority is claimed on Japanese Patent Application No. 2020-090677, filed May 25, 2020, the content of which is incorporated herein by reference.

BACKGROUND ART

Devices for separating specific particles from mixed sized particles in a liquid are known in the related art. For example, the cellular components of blood are mainly red blood cells, white blood cells, and platelets; however, it is known that cells with an extremely low presence ratio are mixed in the above, such as circulating tumor cells/CTCs in blood and fetal nucleated red blood cells (fNRBC).

In order to separate and acquire cells with such an extremely low presence ratio, there are methods for separation and enrichment according to affinity using antibodies with respect to surface markers of the target cells; however, the separation efficiency depends on the expression level of the surface markers and cells with low expression levels may be missed.

In addition, in the case of methods for separation and enrichment according to affinity, molecules such as antibodies bind to the target cells, thus, intracellular signal transduction systems are activated or suppressed and there is a risk that, after acquisition, the cells will not reflect their natural state.

Accordingly, label-free separation methods that do not influence the target cells are desirable.

As label-free separation methods, there are methods using negative selection using antibodies that bind to cells other than the target cells as well as differences in physical properties such as cell size, deformability, and density.

In negative selection, for example, to separate cancer cells in blood, white blood cells are labeled with a CD45 antibody bound to magnetic particles, the labeled white blood cells are attracted and attached to a magnet in a column, and cancer cells in the fraction of cells that are not attracted and attached are identified (Non-Patent Document 1).

However, enrichment methods using negative selection have a low recovery rate as, when a large number of white blood cells are pulled toward the magnet, target cells are also brought in. For example, according to Non-Patent Document 2, the recovery rate is reported as 58%.

As separation methods using differences in physical properties such as cell size or deformability, separation is known which uses filters with pores, or microfluidic channel chips having a fine comb structure or a stepped structure. In the case of filters, since the occurrence of clogging will make separation impossible, the size, shape, and density of the pores have to be optimized such that it is possible to supplement only the target cells and to remove excess cells.

Cells enriched by such separation methods using physical properties are label-free and immunostaining using specific antibodies is performed on the target cells to visualize and identify the target cells. However, since the separation filter is flexible, when identifying cells by microscopic observation, distortion occurs in the filter, making it difficult to focus. Therefore, the cells captured by the filter are transferred back into the tube, then a staining operation is performed in the tube, and the result is transferred to a glass slide to be observed, but there is a risk of losing cells during the staining operation process.

As for separation using size or deformability, there are microfluidic channel chips formed with a microfilter shape or a gap shape, which have a shape separation function in which microscopic processing is performed. In such a case, since the separation and capturing processes are performed in the microfluidic channels, it is possible to perform staining as is in the chip after processing, the rigidity is higher than that of a filter, and it is possible to carry out the microscopic observation thereon as is.

In methods using a separation filter and separation methods using a microfluidic channel chip, it is possible to recover the retained cells in a tube or the like by reversing the flow direction. It is possible for the cells recovered in a tube or the like to be re-spread on a glass slide to isolate specific cells only. However, when cells are spread with high density, the cells overlap each other and thus observation is difficult and, in a case where the cells are to be recovered, there is a risk of recovering cells other than the target cells.

For this reason, methods are known in which single cells are arrayed using a filter or substrate having single cell-sized compartments with partition walls. For example, a filter having microwells having through holes at the bottom has the advantage that it is possible to simultaneously perform separation by size and deformability and the arraying of single cells, thus, the adjacent cells are partitioned and separated and it is possible to recover and analyze single cells.

In a case of filters having microwells, when observing or recovering cells, the housing or gasket holding the filter is disassembled and the filter is extracted or the flow direction is reversed to recover the retained cells (Non-Patent Document 3).

However, when the number of microwells is finite and all microwells are occupied by cells, no further separation and storage is possible. Separation methods are known which combine a plurality of separation techniques. For example, a method is known in which, after size separation is performed using a filter, white blood cells are removed by negative selection using a CD45 antibody and the cells are supplemented into microwells using dielectrophoresis chips (Non-Patent Document 4). However, in this method, it is necessary to transfer cells to the device at each step and there is a problem in that rare cells may be lost.

CITATION LIST

Non-Patent Documents

[Non-Patent Document 1]
 INTERNATIONAL JOURNAL OF ONCOLOGY 21: 521-530, 2002 521.
[Non-Patent Document 2]
 Liu, Z. et al. Negative enrichment by immunomagnetic nanobeads for unbiased characterization of circulating tumor cells from peripheral blood of cancer patients. J. Transl. Med. 9, 70-70 (2011).
[Non-Patent Document 3]
 S Khetani et al. Filter-based isolation, enrichment, and characterization of circulating tumor cells. Biotechnol Bioeng. 2018 October; 115(10):2504-2529.

[Non-Patent Document 4]
Cancer marker-free enrichment and direct mutation detection in rare cancer cells by combining multi-property isolation and microfluidic concentration Lab Chip, 2019, 19, 757-766.

SUMMARY OF INVENTION

Technical Problem

The present invention was created in order to solve the problem described above and provides a target particle separation method and system with which it is possible to suppress target particle loss by performing filter separation of target particles, removal of non-target cells, and storage of the target particles in wells in a single device.

Solution to Problem

In order to solve the problems described above, each aspect of the present invention is provided with the following configurations.

[1] An aspect of the present invention is a target particle separation method for separating target particles from a fluid including the target particles and non-target particles, which uses a particle capturing device equipped with a chamber, an inlet channel into the chamber, an outlet channel from the chamber, a filter provided in the outlet channel that does not allow the target particles to pass through but allows the fluid to pass through, and a target particle capturing film provided in the chamber, in which the target particle capturing film has a plurality of wells formed to face an inner side of the chamber and capable of accommodating the particles in an inner portion, the method including an introduction step of introducing the fluid including the target particles and the non-target particles from the inlet channel into the chamber, an enrichment step of enriching the target particles and at least a part of the non-target particles in the filter by discharging at least a part of the fluid through the first outlet channel, a separation step of separating the non-target particles filtered out with the filter from the target particles with a suction unit for suctioning only the non-target particles, and a storage step of storing the target particles in the wells in the chamber.

According to the target particle separation method, by introducing a fluid including target particles and non-target particles from the inlet channel into the chamber of the particle capturing device and discharging at least a part of the fluid through the first outlet channel, the target particles and at least a part of the non-target particles are enriched by the filter. Next, the non-target particles filtered out by the filter are separated from the target particles by a suction unit that suctions only these non-target particles and the target particles are stored in the wells in the chamber.

According to this method, it is possible to perform the filter separation of target particles, the removal of non-target cells filtered out together with the target particles, and the storage of the target particles in wells in a single particle capturing device and to suppress target particle loss.

[2] In aspect [1] described above, a labeling step of labeling the non-target particles with a magnetic antibody prior to the introduction step may be further included, in which, in the separation step, the labeled non-target particles may be suctioned by magnetic force of the suction unit and the labeled non-target particles may be separated from the target particles.

According to this method, the non-target particles are labeled with magnetic antibodies prior to the introduction step and, in the separation step, magnetic force is generated by the suction unit and the labeled non-target particles are suctioned and separated from the target particles by this magnetic force, thus, the suction force for the non-target particles is easily controlled by controlling the magnetic force and it is easy to achieve optimum separation conditions.

[3] In aspect [1] described above, a negative selection marker that selectively binds to the non-target particles may be immobilized in the filter, and, in the separation step, the negative selection marker immobilized in the filter may bind to the non-target particles to separate the non-target particles from the target particles.

According to this method, by immobilizing the negative selection marker in the filter and the negative selection marker binding to the non-target particles filtered out by the filter, the non-target particles are separated from the target particles, thus, the non-target particles are easily separated with high selectivity.

[4] In aspect [1] described above, a suction section in which a negative selection marker that selectively binds to the non-target particles is immobilized may be provided in the chamber, and, in the separation step, the negative selection marker immobilized in the suction section may bind to the non-target particles to separate the non-target particles from the target particles.

According to this method, by the negative selection marker being immobilized at a specific position in the chamber and the negative selection marker binding to the non-target particles filtered out by the filter, the non-target particles are separated from target particles, thus, the non-target particles are easily separated to a position away from the target particles with high selectivity.

[5] In the aspects [3] and [4] described above, the non-target particles may be white blood cells and the negative selection marker may be at least one of a CD34 antibody and a CD45 antibody. In such a case, by at least one of the CD34 antibody and CD45 antibody binding to the white blood cells filtered out by the filter, it is possible to separate the white blood cells from the target particles with high selectivity.

[6] In the aspects [1] to [5] described above, a staining step of staining the target particles before or after storage in the wells may be further included. In such a case, since the target particles are stained by the staining step, it is possible to easily perform detection of the target particles after capture in the wells.

[7] In aspect [6] described above, a detection step of specifying the stained target particles by observing inside the wells after the staining step may be further included. In such a case, since the target particles stained by the staining step are detected in the detection step, it is easy to perform inspection and recovery of the target particles captured in the wells.

[8] In aspect [7] described above, a recovery step of recovering the specified target particles after the detection step may be further included. In such a case, since the target particles are recovered after the position is specified, the recovery is easily performed.

[9] Another aspect of the present invention is a target particle separation system for separating target particles from a fluid including the target particles and non-target particles, the system including a particle capturing device equipped with a chamber, an inlet channel into the chamber, an outlet channel from the chamber, a filter provided in the outlet channel that does not allow the target particles to pass through but allows the fluid to pass through, and a target particle capturing film provided in the chamber, in which the target particle capturing film has a plurality of wells formed to face an inner side of the chamber and capable of accommodating the particles in an inner portion, and a suction unit for separating only the non-target particles from the target particles by suction.

According to such a target particle separation system, by introducing a fluid including target particles and non-target particles from the inlet channel into the chamber of the particle capturing device and discharging at least a part of the fluid through the first outlet channel, it is possible to enrich the target particles and at least a part of the non-target particles by the filter. Next, the non-target particles filtered out by the filter are separated from the target particles by a suction unit that suctions only these non-target particles and the target particles are stored in the wells in the chamber. According to this system, it is possible to perform the filter separation of target particles, the removal of non-target cells filtered out together with the target particles, and the storage of the target particles in wells in a single particle capturing device and to suppress target particle loss.

[10] In aspects [1] to [9] described above, an area of the target particle capturing film of the particle capturing device may be smaller than an area of the filter. In such a case, since it is possible to capture target particles in a small area, there is an advantage in that it is possible to easily inspect and recover the target particles.

Advantageous Effects of Invention

As described above, according to the target particle separation method and system of the present invention, it is possible to perform the filter separation of target particles, the removal of non-target cells filtered out together with the target particles, and the storage of the target particles in wells in a single particle capturing device and to suppress target particle loss.

DESCRIPTION OF EMBODIMENTS

Figure 1:
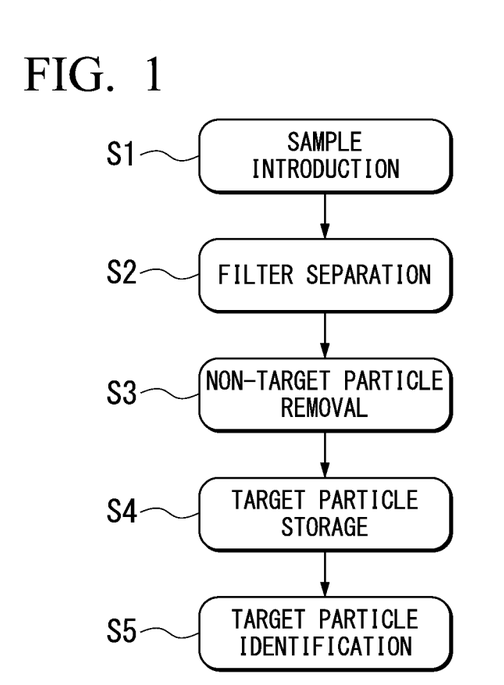
FIG. 1 is a flowchart showing a first embodiment of the target particle separation method according to the present invention.

A detailed description will be given below of embodiments of the target particle separation method and system according to the present invention using the drawings. FIG. 1 is a flowchart showing the first embodiment of the present invention, FIG. 2 to FIG. 7 are longitudinal cross-sectional views of the particle capturing device in each step of the same embodiment and a description will first be given of the structure of a particle capturing device 1 using FIG. 2.

Figure 2:
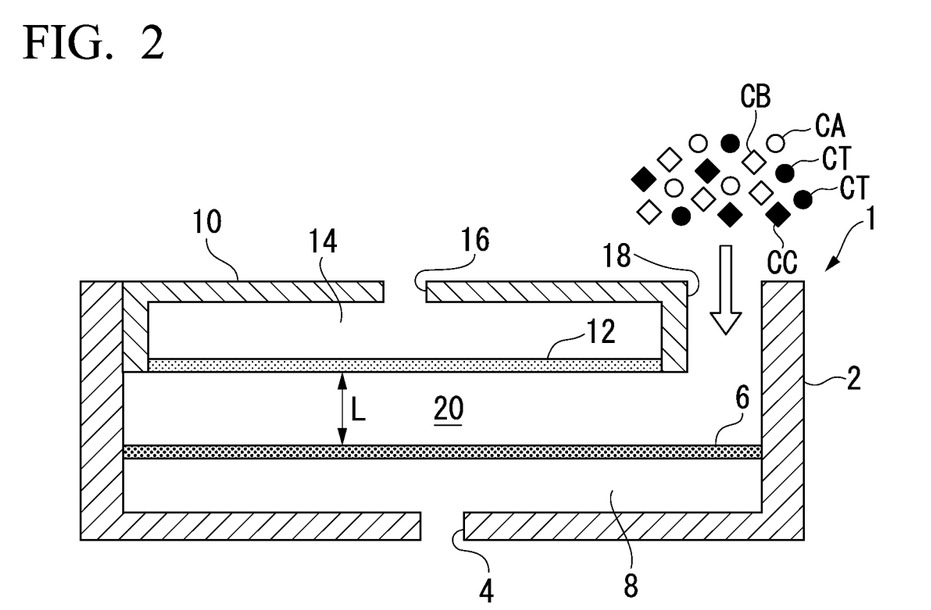
FIG. 2 is a longitudinal cross-sectional view of a particle capturing device showing a step of introducing a fluid including target particles and non-target particles into a chamber, in the same embodiment.

The particle capturing device 1 has a device body 2 that has a container shape with an opened top surface, a target particle capturing film 6 is arranged in the device body 2, and the space below the target particle capturing film 6 is a first outlet channel 8. The shape of the device body 2 is not limited and may be any shape, for example, it is possible to employ a shape having a flat bottom having a planar shape such as a rectangle, ellipse, or circle and a peripheral wall rising vertically from the bottom, or the like. The target particle capturing film 6 is preferably arranged horizontally and flat when the device body 2 is in a state of being used, but may not necessarily have to be horizontal and flat, for example, the target particle capturing film 6 may be slightly inclined or curved as necessary.

The device body 2 has an outlet 4 formed at a location therein, it is possible to discharge the fluid in the first outlet channel 8 through the outlet 4 and the fluid flows from top to bottom through the target particle capturing film 6 as the discharging proceeds. In the illustrated example, one outlet 4 is formed in the center of the bottom of the device body 2, but, without being limited to this configuration, the outlet 4 may be formed on the peripheral wall or other parts of the device body 2, or a plurality thereof may be formed, or the entire bottom edge of the device body 2 may be opened as the outlet 4.

On the upper side of the device body 2 above the target particle capturing film 6, a filter holding portion 10 is arranged away from the target particle capturing film 6. A filter 12 is arranged at the lower end of the filter holding portion 10, a second outlet channel 14 is formed above the filter 12 inside the filter holding portion 10, and an outlet 16 is formed leading from the second outlet channel 14 through to the outside. The filter 12 in this example is preferably arranged horizontally and flat when the device body 2 is in a state of being used, but may not necessarily have to be horizontal and flat, for example, the filter 12 may be slightly inclined or curved as necessary.

Figure 7:
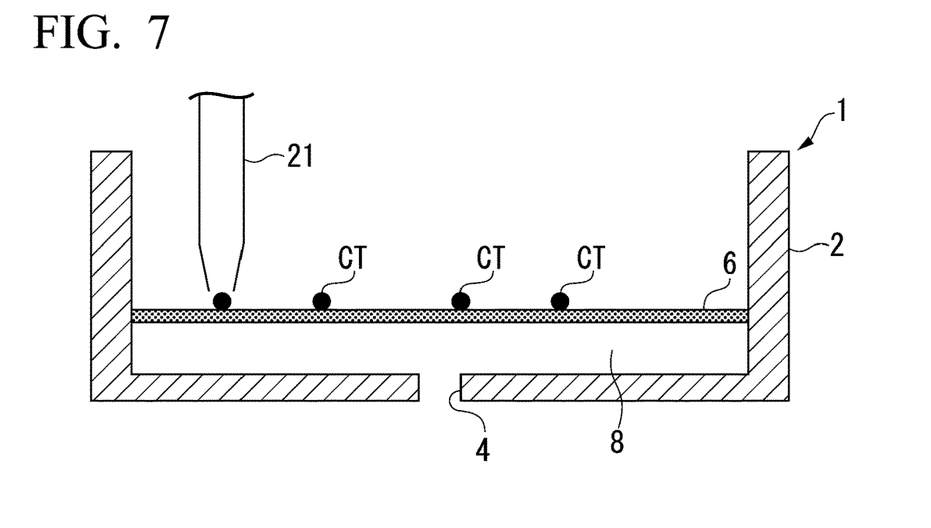
FIG. 7 is a longitudinal cross-sectional view of a particle capturing device showing a step of recovering target particles, in the same embodiment.

The filter holding portion 10 may be immobilized in the device body 2, but is more preferably detachable from the device body 2, in which case, when the filter holding portion 10 is extracted from the device body 2, it is possible to expose the top surface of the target particle capturing film 6, for example, as shown in FIG. 7, the target particles CT captured on the top surface of the target particle capturing film 6 are easily directly manipulated by a manipulation unit 21 such as a micropipette.

In the filter holding portion 10, the bottom is formed of the filter 12, the second outlet channel 14 is formed in the inside, and the outlet 16 is formed leading from the second outlet channel 14 to the outside. In this example, one outlet 16 is formed in the center of a top plate of the filter holding portion 10, but, without being limited to this configuration, the outlet 16 may be formed on the side surface of the filter holding portion 10, or a pair of the outlets 16 may be formed leading to both ends of the second outlet channel 14.

A chamber 20 is formed between the target particle capturing film 6 of the device body 2 and the filter 12 of the filter holding portion 10. In addition, an inlet channel 18, which is connected to the chamber 20, is formed in at least a part between the device body 2 and the filter holding portion 10. A configuration is also possible in which the entire top surface of the device body 2 is sealed in the filter holding portion 10 and the inlet channel 18 is formed in the side surface of the device body 2.

Figure 8:
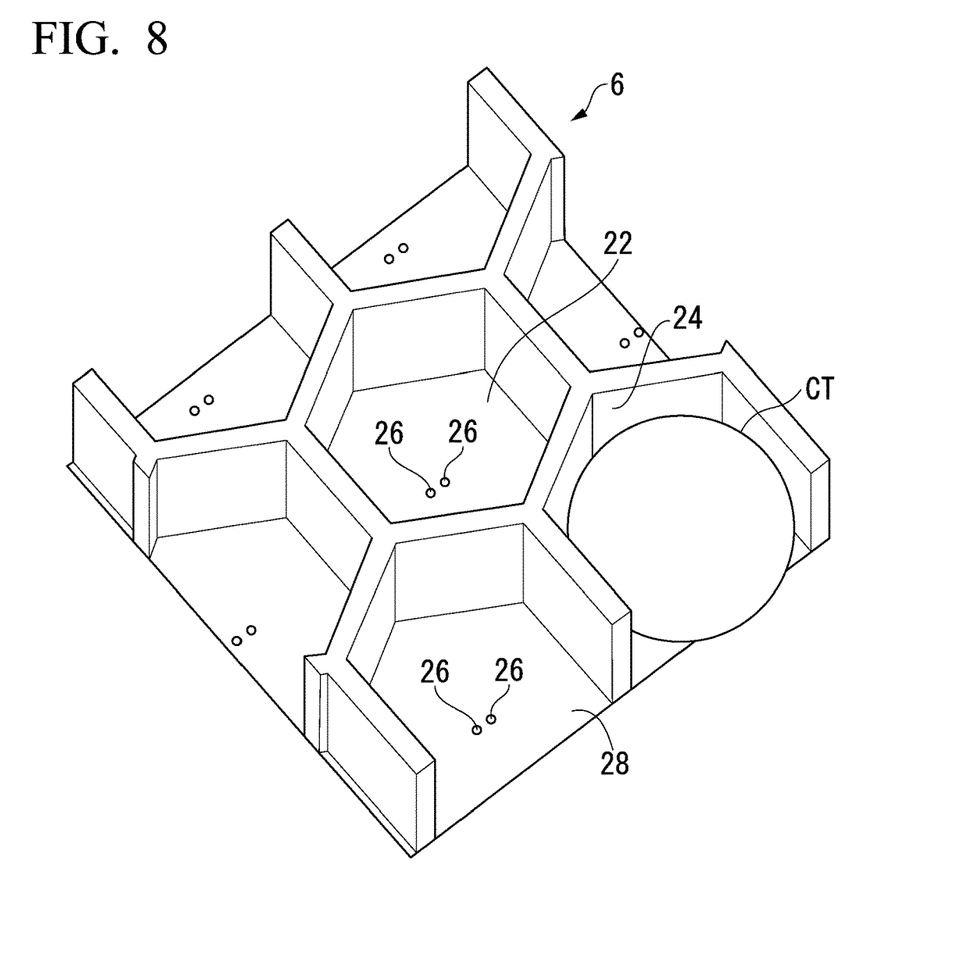
FIG. 8 is an enlarged oblique view showing an example of a target particle capturing film.

In the target particle capturing film 6 in this example, a large number of microscopic wells 22 forming a concave shape with respect to the top surface are formed in a regular manner, as shown in FIG. 8. In this example, each of the wells 22 has a regular hexagonal shape in plan view and has a well bottom 28 with a hexagonal shape and a well wall 24 that forms a regular hexagonal cylinder rising from each of the well bottoms 28, and the well walls 24 as a whole have a honeycomb structure. The shape of the wells 22 is not limited to such a hexagonal shape, but may be circular or square.

In the center of the well bottom 28, two well outlets 26 are formed through the top and bottom for each of the wells 22 and the fluid in the wells 22 is discharged through the well outlets 26 to the bottom surface side of the target particle capturing film 6. In this example, two of the well outlets 26 are formed for each of the wells 22, but the number of well outlets 26 for each of the wells 22 may be one or three or more. In the case of two or more, there is an advantage in that the well outlets 26 are less likely to be completely blocked even in a case where the target particles CT enter the wells 22.

It is possible to select the dimensions and depth of the wells 22 according to the dimensions of the target particles CT to be captured. Specifically, the dimensions and depth of the wells 22 are set to be slightly larger than the target particles CT to be captured, with one target particle CT being set to fit inside the well 22 and leave a small gap with the well wall 24. As necessary, the wells 22 may each be sized to accommodate a predetermined number of the target particles CT, such as two, three, or more target particles CT, therein.

The target particle capturing film 6 may be directly attached to the device body 2, or may instead be immobilized in a frame, which is not shown, and the frame may be attached to be detachable from the device body 2. In such a case, there is an advantage in that it is possible to select the size of the wells 22 by replacing the target particle capturing film 6 together with the frame. There is also an advantage in that it is possible to re-use the device body 2 even in a case where the target particle capturing film 6 is no longer usable.

The filter 12 is a porous film having a number of perforations of approximately constant size, the size of the perforations is larger than the size of the non-target particles (CB and CC in FIG. 2 to FIG. 7) allowed to pass therethrough and smaller than the size of the target particles CT and the non-target particles (CA in FIG. 2 to FIG. 7) not allowed to pass therethrough. Due to this, the non-target particles CB and CC pass through the filter 12, while the target particles CT and the non-target particles CA are not able to pass through the filter 12. The filter holding portion 10 may be separately provided for each pore size of the filter 12 and it may be possible to change the size of the perforations by replacing the filter holding portion 10.

A separation amount L (FIG. 2) between the filter 12 and the target particle capturing film 6 is preferably approximately constant over the entire area of the target particle capturing film 6. In such a case, the target particles CT falling from the bottom surface of the filter 12 descend while dissipating throughout the fluid and reach the top of the target particle capturing film 6 with approximately the same dispersion area, thus, it is possible for the wells 22 over the entire area of the target particle capturing film 6 to capture the target particles CT with approximately equal probability.

In this embodiment, the areas of the filter 12 and the target particle capturing film 6 are approximately the same, but, as in the embodiment shown in FIG. 11 below, the area of the target particle capturing film 6 is smaller than the area of the filter 12 such that the target particles CT descend while being concentrated in the small area and inspection of the target particles CT and recovery by the manipulation unit 21 are easily carried out. In addition, if necessary for some reason, it is also possible for the area of the target particle capturing film 6 to be larger than that of the filter 12.

A description will be given of the target particle separation method of the first embodiment following the flowchart in FIG. 1. The following description corresponds, for example, to a case where human or animal blood or a diluted solution or component extract of blood is used as a sample and specific target cells are captured from among a plurality of cell types present in the blood, but the present invention is not limited to blood samples and any biological or non-biological sample may be used and any particles included therein may be used as target particles. It is possible to use various buffers suitable for storage of the target particles CT as the fluid.

In step S1, as shown in FIG. 2, a fluid including the target particles CT and the non-target particles CA, CB, and CC is introduced from the inlet channel 18 into the chamber 20. In the example in the figure, there are three types of non-target particles, but this is merely an example and there may be one or two types of non-target particles, or four or more types. The target particles CT may also include a plurality of types of particles.

Figure 3:
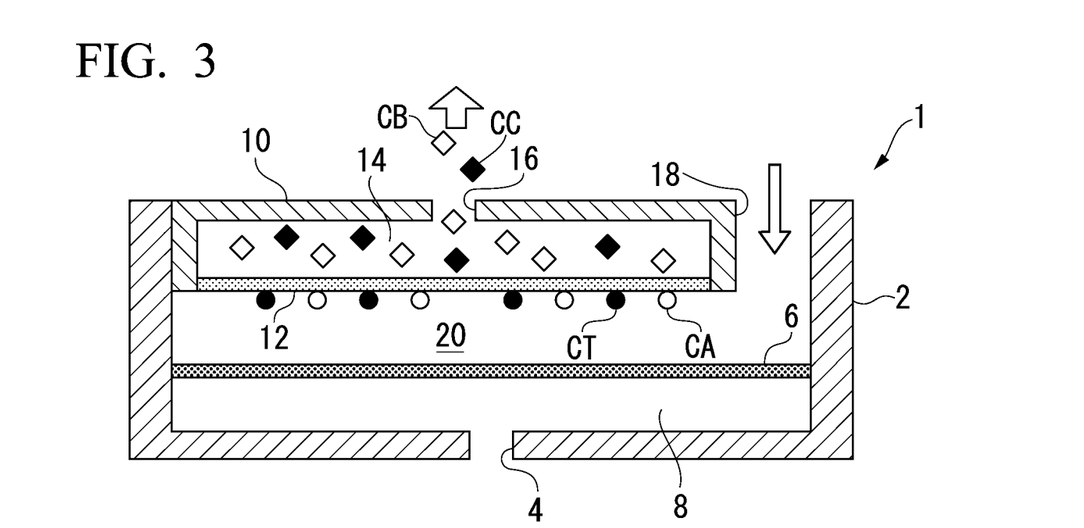
FIG. 3 is a longitudinal cross-sectional view of a particle capturing device showing a step of enriching target particles with a filter, in the same embodiment.
Figure 4:
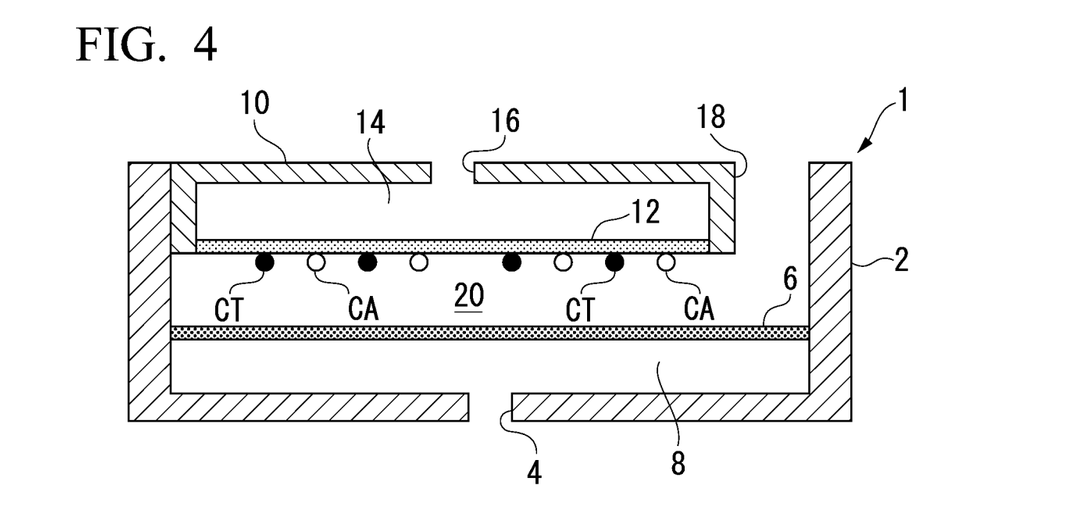
FIG. 4 is a longitudinal cross-sectional view of a particle capturing device showing a state in which target particles are enriched by a filter, in the same embodiment.

In step S2, as shown in FIG. 3, while the fluid is supplied as appropriate from the inlet channel 18, the fluid in the second outlet channel 14 is suctioned from the outlet 16 by a suction unit which is not shown. Due to this, the non-target particles CB and CC of a size which passes through the filter 12 enter the second outlet channel 14 and are discharged from the outlet 16. Eventually, as shown in FIG. 4, it is possible to enrich almost exclusively the target particles CT and the non-target particles CA in the chamber 20 using the filter 12.

Figure 5:
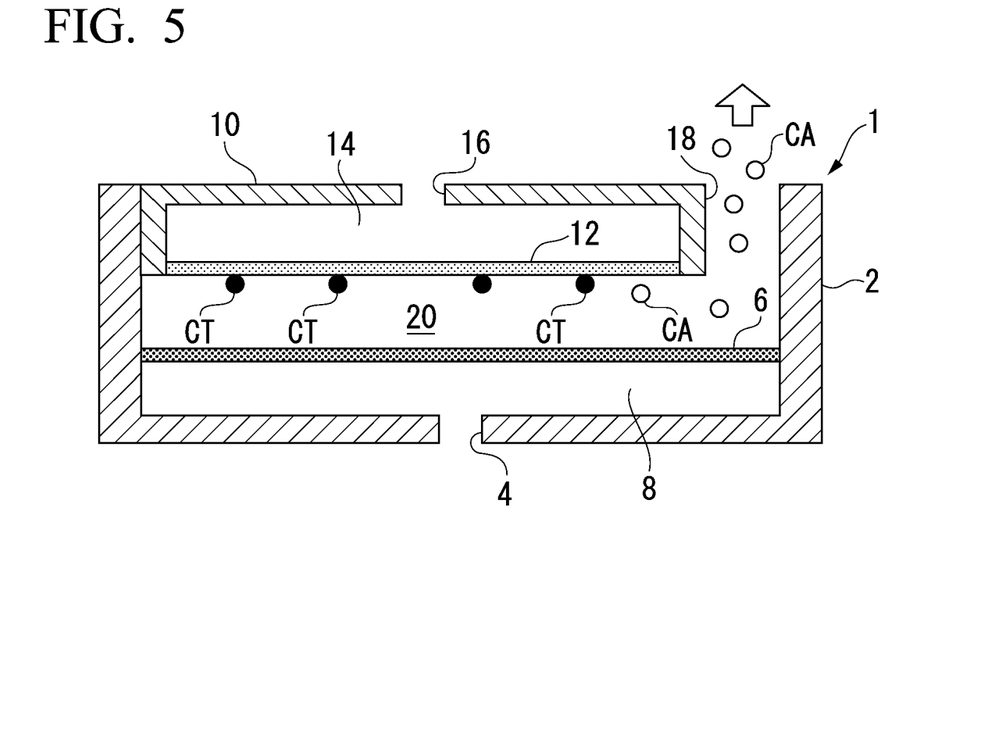
FIG. 5 is a longitudinal cross-sectional view of a particle capturing device showing a step of separating non-target particles from the target particles by suction, in the same embodiment.

In step S3, as shown in FIG. 5, in the target particles CT and non-target particles CA captured on the bottom surface of the filter 12, only the non-target particles CA are made to drop out of the filter 12 by the suction unit, which is not shown, and are separated from the target particles CT remaining in the filter 12.

In this first embodiment, the suction unit uses a balance between the amount of fluid in and out of the outlet 4, the amount of fluid in and out of the outlet 16, and the amount of fluid discharged from the inlet channel 18. That is, by controlling the three flow rates of the amount of fluid in and out of the outlet 4, the amount of fluid in and out of the outlet 16, and the amount of fluid discharged from the inlet channel 18, the velocity of the fluid flowing through the filter 12 is adjusted, the target particles CT remain on the lower surface of the filter 12, the non-target particles CA drop out of the filter 12, and the non-target particles CA that dropped out of the filter 12 are discharged from the inlet channel 18.

Such a suction unit is usable because there are differences in the specific gravity, size, and/or attachment to the filter 12 of the target particles CT and the non-target particles CA (physical attachment strength, surface affinity, particle shape differences, and the like) and, due to the velocity of the fluid flowing through the filter 12, there may be a difference in whether the particles remain on the lower surface of the filter 12 or drop out of the filter 12. In a case where it is not possible to perform such control of the remaining/dropping out using the fluid flow velocity, it is possible to employ separation by magnetic force, separation by negative selection markers, separation by electrostatic force, or the like, as in the second to fourth embodiments described below.

Figure 6:
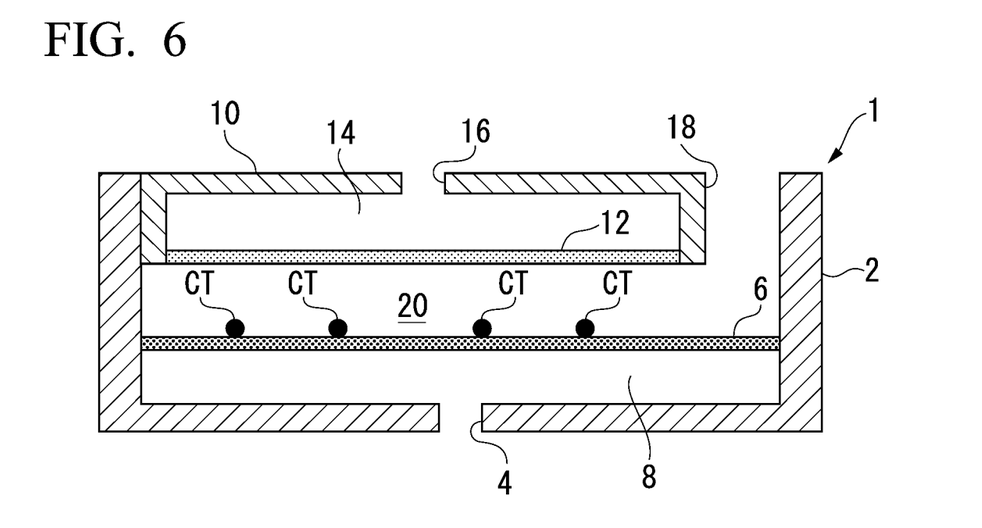
FIG. 6 is a longitudinal cross-sectional view of a particle capturing device showing a step of storing target particles in wells, in the same embodiment.

In step S4, as shown in FIG. 6, the target particles CT are made to drop out from the filter 12 in the chamber 20, descend through the fluid, and are stored in the wells 22 of the target particle capturing film 6. At that time, the fluid may be stopped from entering and exiting the outlet 4, the outlet 16, and the inlet channel 18. Alternatively, when necessary to promote the capturing of the target particles CT, fluid from the inlet channel 18 may be supplied into the chamber 20 while fluid is discharged from the outlet 4 to draw the target particles CT into the wells 22.

In step S5, as shown in FIG. 7, the filter holding portion 10 is extracted from the device body 2, the position of the target particles CT captured by any of the wells 22 of the target particle capturing film 6 is identified by a microscope or inspection device, which is not shown, such that the target particles CT may be recovered one by one from the wells 22 by the manipulation unit 21, which is a micropipette or the like. Alternatively, various types of inspections may be performed on the specified target particles CT in a state of being captured in the wells 22 of the target particle capturing film 6 without recovering the target particles CT.

To make the identification of the target particles CT easy, a staining step may be provided in which the target particles CT are stained with various staining agents in advance. The staining step may be performed before step S1, that is, at the time of sample preparation, or a dye may be added to the fluid in any of steps S2 to S4 to stain the target particles CT. The type of staining agent is not limited and it is possible to use any staining agent used for similar purposes in the related art.

As the detection step of identifying the stained target particles by observing the inside of the wells, it is possible to identify at which position the target particles CT are captured in the wells 22 of the target particle capturing film 6 by combining the wavelengths at which the staining agent emits light, the wavelengths for absorbing light, using observation using a microscope, observation using a fluorescence microscope, carrying out image processing on the above using a computer, or the like. In a case where the coordinates are identified by a computer, it is possible to automatically recover or inspect the target particles CT in the wells 22 at that position.

According to the first embodiment described above, it is possible to perform the separation of the target particles CT by the filter 12, the separation and removal of the non-target cells CA filtered out together with the target particles CT, and the storage of the target particles CT in the wells 22 in the single particle capturing device 1 and to suppress loss of the target particles CT.

Second Embodiment Using Magnetic Force

Figure 9:
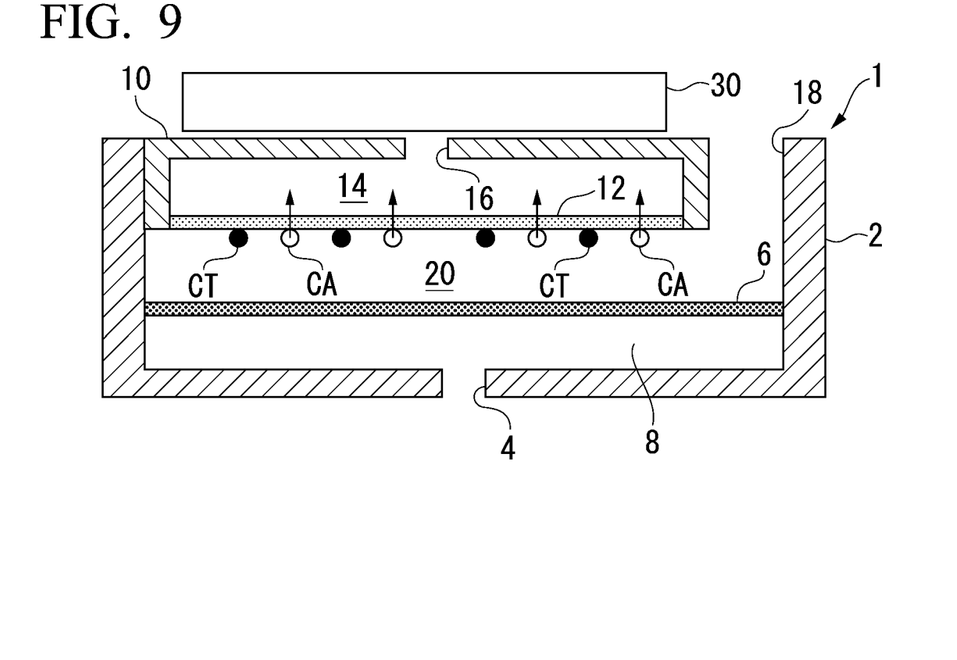
FIG. 9 is a longitudinal cross-sectional view of a particle capturing device showing a step of separating non-target particles from target particles by suction in a second embodiment of the target particle separation method according to the present invention.

FIG. 9 shows step S3 (removal step of the non-target particles) in the second embodiment of the present invention. The other steps S1, S2, S4, and S5 may be the same as in the first embodiment unless otherwise stated, but in this second embodiment, prior to step S1 (the introduction step), a labeling step is further provided in which the non-target particles CA that do not pass through the filter 12 are labeled with a magnetic antibody in advance. As the magnetic antibody, for example, it is possible to use magnetic beads or the like to which antibodies, which bind to antigens present on the surface of the non-target particles CA that do not pass through the filter 12, are bound in advance on the surface.

As magnetic beads, for example, it is possible to use beads having cores such as ferrites such as spinel ferrites ($AFe_2O_4$ (A is Mn, Co, Ni, Cu, Zn, or the like) or hexagonal ferrites ($AFe_{12}O_{19}$ (A is Ba, Sr, Pb, or the like), in which the core surface is coated with hydrophilic polymers, lipids, or the like to impart functional groups thereto and antibodies and proteins such as adivin, albumin, protein A, or protein G are imparted to the functional groups; beads in which antibodies are imparted in the same manner as described above using a polymeric polymer core with a magnetizable substance such as ferrite dispersed inside; or the like.

The magnetic beads may be of a micron (m) size or nano (nm) size. In a case of micron size, there is a strong magnetic force per particle, thus, the supplementation effect due to magnetization is high, but a smaller specific surface area reduces the amount of active substance able to be bound per unit mass of beads. On the other hand, since nano-sized beads have a large specific surface area, the amount of active substance able to be bound per unit mass of beads is increased and the sensitivity for detecting the target particles CT is easily increased. It is possible to use different types of beads depending on the purpose.

In the method of this second embodiment, in step S2 shown in FIG. 3, while fluid is supplied as appropriate from the inlet channel 18, the fluid in the second outlet channel 14 is suctioned from the outlet 16 by a suction unit which is not shown. Due to this, the non-target particles CB and CC of a size which passes through the filter 12 are discharged from the outlet 16 through the second outlet channel 14, while the target particles CT and non-target particles CA of a size larger than the perforations of the filter 12 are not able to pass through the filter 12 and remain in the chamber 20.

At this time, or from the beginning of the filtering in step S2 shown in FIG. 3, a magnet 30 is arranged on the opposite side of the filter 12 from the particle capturing surface, that is, on the upper side of the filter 12, as shown in FIG. 9. Due to this, the non-target particles CA, which have magnetic beads attached in advance to the surfaces thereof, are suctioned by the magnetism generated by the magnet 30 and are pressed against the filter 12 so as to be maintained in a state of being captured by the filter 12. In contrast, the target particles CT do not have magnetic beads attached thereto and are thus not influenced by the magnetic force generated by the magnet 30, thus, the target particles CT easily drop out of the filter 12, descend through the fluid to reach the target particle capturing film 6 and be captured in the wells 22.

The magnet 30 may be a permanent magnet or an electromagnet. In a case where an electromagnet is used, it is possible to switch between suction/non-suction of the non-target particles CA by turning a current on and off and there is a further advantage of being able to control the intensity of the suction force by adjusting the current. In the example shown in the figure, the magnet 30 is arranged on top of the filter holding portion 10, but, without being limited to this structure, it is also possible to arrange the magnet 30 inside the filter holding portion 10 and the magnet 30 may be divided into a plurality of small magnets so as to turn the magnetic force on or off in unison, or may be held on a common support to be able to be moved up and down at the same time.

When the target particles CT are captured in the wells 22, the magnet 30 is extracted along with the filter holding portion 10, the non-target particles CA are removed along with the filter 12 to expose the target particle capturing film 6, and the target particles CT in the wells 22 are inspected or recovered by the manipulation unit 21, which is a micropipette or the like.

According to this method, the non-target particles CT are labeled with magnetic antibodies prior to step S1, and in step S3, the labeled non-target particles CA are suctioned by the magnetic force of the magnet 30 and separated from the target particles CT, thus, it is possible to easily control the suction force for the non-target particles CA by controlling the magnetic force and to easily realize optimum separation conditions.

Third Embodiment

Figure 10:
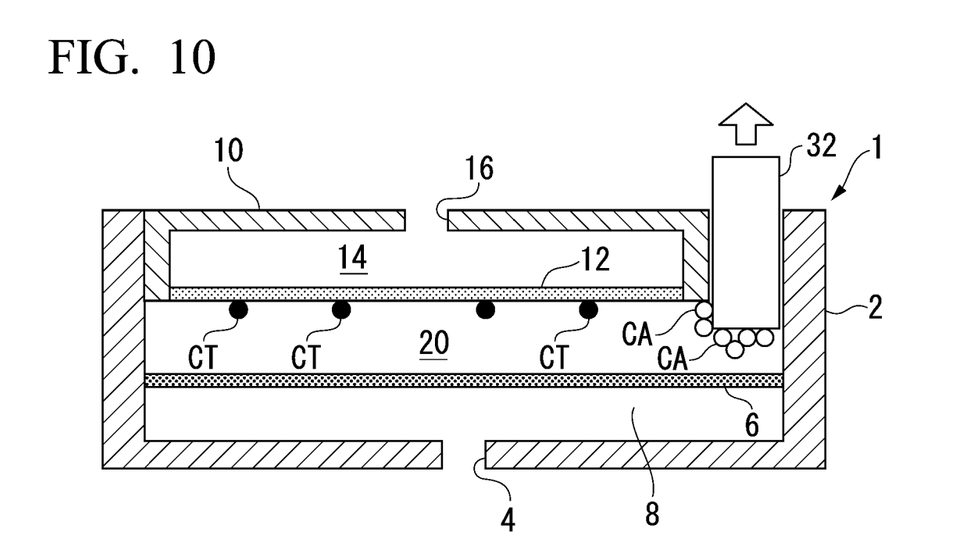
FIG. 10 is a longitudinal cross-sectional view of a particle capturing device showing a step of separating non-target particles from target particles by suction in a third embodiment of the target particle separation method according to the present invention.

FIG. 10 shows step S3 (the removal step of the non-target particles) in the third embodiment of the present invention. The other steps S1, S2, S4, and S5 may be the same as in the first embodiment unless otherwise stated, but in this third embodiment, in the same manner as in the second embodiment, prior to step S1 (the introduction step), a labeling step is further provided in which the non-target particles CA that do not pass through the filter 12 are labeled with a magnetic antibody in advance. The magnetic antibody may be the same as in the second embodiment.

In the method of this third embodiment, in step S2 shown in FIG. 3, while the fluid is supplied as appropriate from the inlet channel 18, the fluid in the second outlet channel 14 is suctioned from the outlet 16. Due to this, the non-target particles CB and CC of a size which passes through the filter 12 are discharged from the outlet 16 through the second outlet channel 14, while the target particles CT and non-target particles CA of a size larger than the perforations of the filter 12 are not able to pass through the filter 12 and remain in the chamber 20.

When the filtering is complete, a magnet 32 is inserted into the chamber 20 from the inlet channel 18, as shown in FIG. 10. Due to this, the non-target particles CA, which have magnetic beads attached in advance to the surface, are suctioned by the magnetism generated by the magnet 32 and pulled away from the filter 12 to be adsorbed to the magnet 32. In contrast, the target particles CT do not have magnetic beads attached thereto and are thus not affected by the magnetic force generated by the magnet 32 and, when the target particles CT drop out of the filter 12, the target particles CT descend through the fluid to reach the target particle capturing film 6 and be captured in the wells 22.

When the target particles CT are captured in the wells 22, the non-target particles CA are removed along with the magnet 32, the filter holding portion 10 is extracted, the target particle capturing film 6 is exposed, and the target particles CT in the wells 22 are inspected or recovered by the manipulation unit 21, which is a micropipette or the like.

According to this method, using the magnet 32 placed at a position away from the filter 12 makes it possible to draw the non-target particles CA labeled with magnetic antibodies to a position away from the target particles CT, thus, there is an advantage that the non-target particles CA are easily separated.

Fourth Embodiment

In the fourth embodiment of the present invention, a negative selection marker that selectively binds to non-target particles CA that do not pass through the filter 12 is immobilized in advance in the filter 12.

As the negative selection marker, for example, it is possible to use an antibody or the like that selectively binds to an antigen present on the surface of the non-target particles CA that do not pass through the filter 12. Due to this, in step S3 shown in FIG. 3, the negative selection marker immobilized in the filter 12 binds to the non-target particles CA such that the non-target particles CA are maintained as is in a state of attachment to the filter 12. On the other hand, the target particles CT do not bind to the negative selection markers on the filter 12 and thus drop out of the filter 12 to descend through the fluid to reach the target particle capturing film 6 and be captured in the wells 22.

According to this method, a negative selection marker is immobilized in the filter 12 and this negative selection marker binds to the labeled non-target particles CA filtered out by the filter 12, such that the non-target particles CA are separated from the target particles CT, thus, it is possible to separate the non-target particles CA with high selectivity.

Fifth Embodiment

In the fifth embodiment of the present invention, a negative selection marker that selectively binds to non-target particles CA that do not pass through the filter 12 is immobilized at a location other than the filter 12. Specifically, a suction section in which a negative selection marker that selectively binds to non-target particles CA is immobilized is provided in the chamber 20 and, in the separation step, the negative selection marker immobilized in the suction section binds to non-target particles CA such that the non-target particles CA are separated from the target particles CT. On the other hand, the target particles CT do not bind to the negative selection markers on the filter 12 and thus drop out of the filter 12 to descend through the fluid to reach the target particle capturing film 6 and be captured in the wells 22.

The position of the suction section is not limited other than being inside the chamber 20, for example, a negative selection marker may be immobilized at the inner wall surface of the chamber 20 of the device body 2, or a member having the suction section may be inserted into the chamber 20 by being passed through the inlet channel 18 or through the wall surface of the device body 2 from a specially provided insertion opening. Instead of the magnet 32 in FIG.

10, there may be a structure in which a member 32 provided with a suction section is inserted into the chamber 20.

According to this method, a negative selection marker is immobilized at a specific position in the chamber 20 and this negative selection marker binds to the non-target particles CA filtered out by the filter 12 such that the non-target particles CA are separated from the target particles CT, thus, it is easy to separate the non-target particles CA to a position away from the target particles CT with high selectivity.

Sixth Embodiment

In a sixth embodiment of the present invention, the non-target particles CA that do not pass through the filter 12 are white blood cells and the negative selection marker is at least one of a CD34 antibody and a CD45 antibody. In such a case, the target particles CT are not limited but, for example, may be circulating tumor cells/CTCs in blood, fetal nucleated red blood cells (fNRBC), or the like.

CD34 antibodies selectively bind to a CD34 antigen present on the surface of hematopoietic stem cells that produce white blood cells in blood. CD45 antibodies selectively bind to the CD45 antigen, which is a common white blood cell antigen. By using at least one of these CD34 antibodies and CD45 antibodies as a negative selection marker in the method of the fourth embodiment or fifth embodiment, white blood cells CA, which are the non-target particles, are bound to the CD34 antibodies and CD45 antibodies and the white blood cells CA are separated from the target particles CT. On the other hand, the target particles CT do not bind to the CD34 antibodies and CD45 antibodies and thus drop out of the filter 12 to descend through the fluid to reach the target particle capturing film 6 and be captured in the wells 22.

According to this method, there is an advantage in that it is possible to remove the white blood cells CA, which are difficult to separate from the target particles CT, from the target particles CT with high selectivity.

Seventh Embodiment

Figure 11:
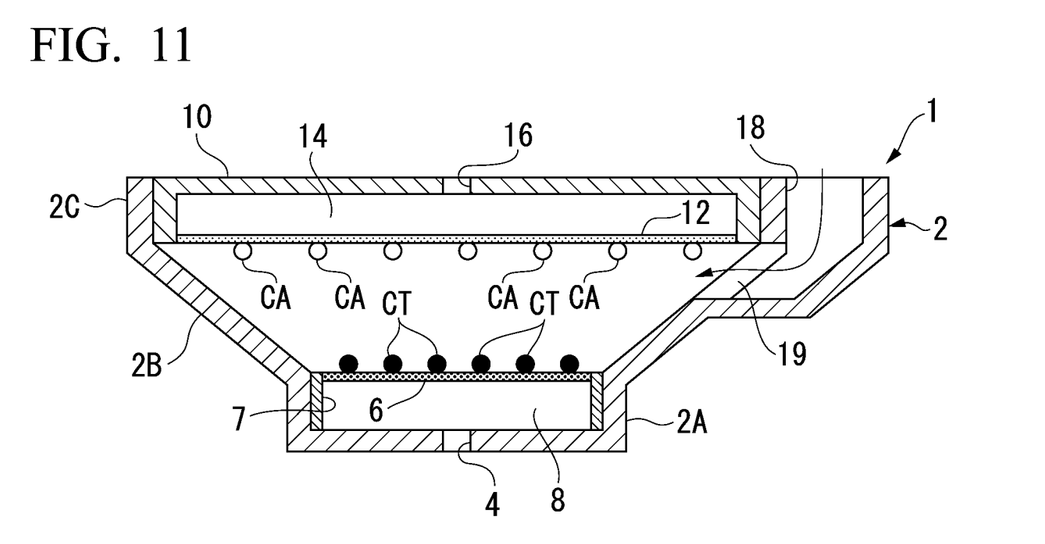
FIG. 11 is a longitudinal cross-sectional view showing a particle capturing device used in a seventh embodiment of the target particle separation method according to the present invention.

FIG. 11 is a longitudinal cross-sectional view showing a seventh embodiment of the particle capturing device 1 usable for the present invention. In this seventh embodiment, the device body 2 has a bottom 2A, a tapered portion 2B, and an enlarged portion 2C. The bottom 2A has a bottom plate and a peripheral wall rising from the periphery thereof and, in this example, the outlet 4 is formed in the center of the bottom plate of the bottom 2A. However, the outlet 4 may not be in this position. The tapered portion 2B is formed upward at an angle from the top end of the peripheral wall of the bottom 2A and has a tapered shape which expands horizontally to the upside. Along the boundary between the bottom 2A and the tapered portion 2B, the target particle capturing film 6 is arranged horizontally in this use configuration and a frame 7 which supports the target particle capturing film 6 is arranged to be extractable along the inside of the peripheral wall of the bottom 2A. The planar shape of the device body 2 is not limited and may be rectangular, circular, oval, rectangular with semi-circular sections on both sides, or the like.

The cylindrical enlarged portion 2C is formed upwardly from the top end of the tapered portion 2B and the filter holding portion 10, which is detachable, is attached to the inside of this enlarged portion 2C to be horizontally detachable in this use configuration. The center position of the filter 12 of the filter holding portion 10 and the center position of the target particle capturing film 6 are preferably arranged to be almost coincident to equalize the density of the descending target particles CT over the target particle capturing film 6, but both being almost coincident is not necessarily essential.

An opening 19 is formed in a part of the peripheral wall of the tapered portion 2B and is connected to the inlet channel 18. It is also possible to insert the magnet 30 along the inlet channel 18 as in the embodiment of FIG. 10, or to arrange the magnet 30 above the filter holding portion 10 as in the embodiment of FIG. 9. In other respects, the configuration may be the same as in the other embodiments described so far and thus will not be described.

According to the seventh embodiment of FIG. 11, the device body 2 has a shape that expands upward and the area of the target particle capturing film 6 is made smaller than the area of the filter 12, thus, the target particles CT are captured in this smaller area such that there is an advantage in that the target particles CT are able to be easily inspected and recovered after the filter holding portion 10 is extracted. The inclination angle of the tapered portion 2B with respect to the vertical line is selected to be an angle at which the target particles CT are not stopped by being attached to the inner wall surface of the tapered portion 2B. In order to set this angle as close to horizontal as possible, a vibration apparatus may be provided in the device body 2 to cause the device body 2 to vibrate slightly to promote the falling of the target particles CT into the target particle capturing film 6.

Although various embodiments of the present invention are described above, the present invention is not limited only to the above embodiments and is to be interpreted broadly based on the claims, each configuration of the above embodiments may be changed to other known configurations, parts of the configurations may be omitted, and configurations may be recombined as appropriate among the embodiments.

INDUSTRIAL APPLICABILITY

According to the target particle separation method and system of the present invention, it is possible to perform the filter separation of target particles, the removal of non-target cells filtered out together with the target particles, and the storage of the target particles in wells in a single particle capturing device and to suppress target particle loss, thus, use is possible for industrial applications.

REFERENCE SIGNS LIST

1: Particle capturing device
2: Device body
2A: Bottom
2B: Tapered portion
2C: Enlarged portion
4: Outlet
6: Target particle capturing film
7: Frame
8: First outlet channel
10: Filter holding portion
12: Filter
14: Second outlet channel
16: Outlet
18: Inlet channel
19: Opening
20: Chamber
21: Manipulation unit
22: Well 24: Well wall
26: Well outlet
28: Well bottom
30: Magnet
32: Magnet
CA to CC: Non-target particles
CT: Target particles

What is claimed is:

1. A target particle separation method for separating target particles from a fluid including the target particles and non-target particles, which uses a particle capturing device equipped with
   a chamber,
   an inlet channel into the chamber,
   a filter, which is a porous film, provided horizontally and flat when the device is in a state of being used, wherein the filter does not allow the target particles to pass through but allows the fluid to pass through, the porous film having a number of perforations being larger than a size of at least a part of the non-target particles and smaller than a size of the target particles,
   a target particle capturing film provided in the chamber with a constant separation amount between the filter and the target particle capturing film,
   a first outlet channel formed below the target particle capturing film,
   a second outlet channel formed above the filter,
   an outlet provided in the first outlet channel, and
   another outlet provided in the second outlet channel,
   a suction unit for suctioning the fluid in either in the inlet channel, in the first outlet channel, or in the second outlet channel,
   in which the target particle capturing film has a plurality of wells formed to face an inner side of the chamber and capable of accommodating the target particles in an inner portion, the method comprising:
   an introduction step of introducing the fluid including the target particles and the non-target particles from the inlet channel into the chamber;
   an enrichment step of enriching the target particles and at least a part of the non-target particles on the filter by filtering the fluid supplied from the inlet channel by suctioning the fluid in the second outlet channel, thereby discharging at least a part of the fluid through the first outlet channel while the target particles and at least the part of the non-target particles remain on the filter;
   a separation step of dropping out, from the filter, only the non-target particles having a size larger than a size of the perforation of the porous film and being filtered out with the filter, and discharging the non-target particles that are dropped out from the filter from the inlet channel to separate the non-target particles from the target particles that remain on the filter, wherein the dropping out and the discharging the non-target particles are controlled by adjusting three flow rates of an amount of fluid in and out from the outlet, an amount of fluid in and out from the another outlet, and an amount of fluid discharged from the inlet channel with the suction unit; and
   a storage step of storing the target particles in the wells in the chamber.

2. The target particle separation method according to claim 1, further comprising:
   a labeling step of labeling the non-target particles in advance with a magnetic antibody prior to the introduction step,
   wherein, in the separation step, the labeled non-target particles are suctioned by magnetic force of the suction unit and the labeled non-target particles are separated from the target particles.

3. The target particle separation method according to claim 1,
   wherein a negative selection marker that selectively binds to the non-target particles is immobilized in the filter, and,
   in the separation step, the negative selection marker immobilized in the filter binds to the non-target particles to separate the non-target particles from the target particles.

4. The target particle separation method according to claim 1,
   wherein a suction section in which a negative selection marker that selectively binds to the non-target particles is immobilized is provided in the chamber, and,
   in the separation step, the negative selection marker immobilized in the suction section binds to the non-target particles to separate the non-target particles from the target particles.

5. The target particle separation method according to claim 3,
   wherein the non-target particles are white blood cells and the negative selection marker is at least one of CD34 and CD45.

6. The target particle separation method according to claim 1, further comprising:
   a staining step of staining the target particles before or after storage in the wells.

7. The target particle separation method according to claim 6, further comprising:
   a detection step of identifying the stained target particles by observing inside the wells after the staining step.

8. The target particle separation method according to claim 7, further comprising:
   a recovery step of recovering the identified target particles after the detection step.

9. A target particle separation system for separating target particles from a fluid including the target particles and non-target particles, the system comprising:
   a particle capturing device equipped with
   a chamber,
   an inlet channel into the chamber,
   a filter, which is a porous film, provided horizontally and flat when the device is in a state of being used, wherein the filter does not allow the target particles to pass through but allows the fluid to pass through, the porous film having a number of perforations being larger than a size of at least a part of the non-target particles and smaller than a size of the target particles,
   a target particle capturing film provided in the chamber with a constant separation amount between the filter and the target particle capturing film,
   a first outlet channel formed below the target particle capturing film,
   a second outlet channel formed above the filter,
   an outlet provided in the first outlet channel,
   another outlet provided in the second outlet channel, and
   a suction unit for suctioning the fluid in either in the inlet channel, in the first outlet channel, or in the second outlet channel,
   in which the target particle capturing film has a plurality of wells formed to face an inner side of the chamber and capable of accommodating the target particles in an inner portion; and a suction unit for separating only the non-target particles from the target particles by suction.

10. The target particle separation system according to claim 9,
wherein an area of the target particle capturing film of the particle capturing device is smaller than an area of the filter.

* * * * *